(12) United States Patent
Schussler et al.

(10) Patent No.: US 10,018,460 B2
(45) Date of Patent: Jul. 10, 2018

(54) INTERFEROMETRIC MEASURING DEVICE WITH DETECTORS SET AT DIFFERENT ANGULAR RANGES

(71) Applicant: Polytec GmbH, Waldbronn (DE)

(72) Inventors: Matthias Schussler, Waldbronn (DE); Christian Rembe, Waldbronn (DE); Alexander Drabenstedt, Ettlingen (DE); Robert Kowarsch, Waldbronn (DE); Wanja Ochs, Karlsruhe (DE)

(73) Assignee: Polytec GmbH, Waldbronn (DE)

( * ) Notice: Subject to any disclaimer, the term of this patent is extended or adjusted under 35 U.S.C. 154(b) by 138 days.

(21) Appl. No.: 13/667,309

(22) Filed: Nov. 2, 2012

(65) Prior Publication Data

US 2013/0107276 A1   May 2, 2013

(30) Foreign Application Priority Data

Nov. 2, 2011 (DE) .................. 10 2011 085 599

(51) Int. Cl.
| | |
|---|---|
| *G01B 9/02* | (2006.01) |
| *G01B 11/14* | (2006.01) |
| *G01H 9/00* | (2006.01) |

(52) U.S. Cl.
CPC ..... *G01B 9/02022* (2013.01); *G01B 9/02002* (2013.01); *G01B 9/02028* (2013.01); (Continued)

(58) Field of Classification Search
CPC ............ G01B 9/02028; G01B 2290/45; G01B 9/02022; G01B 9/02027; G01S 17/58; G01H 9/00

(Continued)

(56) References Cited

U.S. PATENT DOCUMENTS

| | | |
|---|---|---|
| 4,005,936 A | 2/1977 | Redman et al. |
| 5,080,491 A | 1/1992 | Monchalin et al. |

(Continued)

FOREIGN PATENT DOCUMENTS

| | | |
|---|---|---|
| DE | 10393244 | 9/2005 |
| DE | 102008017119 | 10/2009 |

(Continued)

OTHER PUBLICATIONS

Fu, Y. et al., "Cross-Talk Prevention in Optical Dynamic Measurement", Optics and Lasers in Engineering, vol. 50, Nr. 4, Jul. 16, 2011, pp. 547-555.

(Continued)

*Primary Examiner* — Kara E Geisel
*Assistant Examiner* — Violeta A Prieto
(74) *Attorney, Agent, or Firm* — Volpe and Koenig, P.C.

(57) ABSTRACT

A device for the interferometric measuring of an object, including a light source to generate an emitted beam, a beam splitting device for splitting the emitted beam into a measuring beam and at least first and second reference beams, an optic interference device, and first and second detectors, with the interference device and the first detector being embodied cooperating such that the measuring beam, at least partially reflected by the object, and the first reference beam are interfered on at least one detector area of the first detector. The interference device and the second detector are embodied cooperating such that the measuring beam, at least partially scattered by the object, and the second reference beam are interfered on at least one detector area of the second detector. A method is also provided for the interferometric measuring of an object.

20 Claims, 4 Drawing Sheets

(52) U.S. Cl.
CPC ...... *G01B 2290/45* (2013.01); *G01B 2290/70* (2013.01); *G01H 9/00* (2013.01)

(58) Field of Classification Search
USPC .................. 356/28.5, 450–512; 73/657, 655
See application file for complete search history.

(56) References Cited

U.S. PATENT DOCUMENTS

| | | | |
|---|---|---|---|
| 5,087,121 | A | 2/1992 | Kakuchi et al. |
| 5,229,832 | A | 7/1993 | Gaynor |
| 5,883,714 | A * | 3/1999 | Jann ................. G01N 21/88 356/237.2 |
| 6,040,899 | A * | 3/2000 | Breda .......................... 356/28.5 |
| 6,320,665 | B1 * | 11/2001 | Ngoi et al. .................... 356/485 |
| 6,744,520 | B2 * | 6/2004 | Chang et al. ................. 356/499 |
| 7,116,426 | B2 * | 10/2006 | Lal et al. ...................... 356/486 |
| 7,791,731 | B2 | 9/2010 | Kay |
| 7,852,487 | B2 * | 12/2010 | Rembe et al. ................ 356/486 |
| 8,199,331 | B2 | 6/2012 | Rembe et al. |
| 2001/0009473 | A1 * | 7/2001 | Ogino .......................... 359/368 |
| 2005/0219544 | A1 * | 10/2005 | Chan et al. ................... 356/497 |
| 2005/0237533 | A1 | 10/2005 | Lal et al. |
| 2005/0257708 | A1 * | 11/2005 | Sousa .......................... 101/467 |
| 2006/0055937 | A1 * | 3/2006 | Lal et al. ...................... 356/486 |
| 2008/0144041 | A1 * | 6/2008 | Muenter ....................... 356/484 |
| 2008/0198386 | A1 * | 8/2008 | Hirata et al. ................. 356/491 |
| 2008/0285049 | A1 | 11/2008 | Rembe et al. |
| 2008/0304075 | A1 * | 12/2008 | Rembe .......................... 356/457 |
| 2009/0251706 | A1 * | 10/2009 | Rembe et al. ................ 356/484 |
| 2010/0128259 | A1 * | 5/2010 | Bridges et al. .............. 356/138 |
| 2010/0201990 | A1 * | 8/2010 | Rembe et al. ................ 356/457 |
| 2014/0009750 | A1 * | 1/2014 | Schussler et al. ........... 356/28.5 |

FOREIGN PATENT DOCUMENTS

| | | |
|---|---|---|
| JP | 1-145504 | 6/1989 |
| JP | 7-297248 | 11/1995 |
| JP | 10-227617 | 8/1998 |
| JP | 2001-66247 | 3/2001 |
| JP | 2008-216251 | 9/2008 |
| JP | 2009-250983 | 10/2009 |
| JP | 2010-510529 | 4/2010 |
| WO | 2004023071 | 3/2004 |

OTHER PUBLICATIONS

Singapore Search Report dated Oct. 6, 2014.
Singapore Written Opinion dated Sep. 29, 2014.
Office Action for Japanese Patent Application No. 2012-242650, dated Jul. 13, 2017.
Office Action of Japanese Patent Application No. 2012-242650, dated Aug. 8, 2016.

* cited by examiner

INTERFEROMETRIC MEASURING DEVICE WITH DETECTORS SET AT DIFFERENT ANGULAR RANGES

INCORPORATION BY REFERENCE

The following documents are incorporated herein by reference as if fully set forth: German Patent Application No. 102011085599.8, filed Nov. 2, 2011.

BACKGROUND

The invention relates to a device for the interferometric measuring of an object as well as a method for the interferometric measuring of an object.

Devices and methods for the interferometric measuring of an object are known in various embodiments: for example a typical design of a laser Doppler-vibrometer is known which comprises a laser as the light source for generating an emitted beam, a beam splitting device to split the emitted beam into a measuring and a reference beam, an optic interference device, and a first detector.

The measuring beam is guided to a measuring point on an object, and the measuring beam, at least partially reflected, is interfered together with the reference beam on a detector area of the detector so that by assessing the interference signal for example a movement of the object surface at the measuring point in the direction of the optic axis of the measuring beam can be concluded.

Furthermore, arrangements are known comprising a heterodyne design so that by phase modulations in the measuring light the direction of deflection by the surface to be measured can be concluded.

In order to obtain information about oscillations in two or three dimensions it is known to guide the measuring beams of three laser Doppler-vibrometers such that the measuring beams each impact the measuring point on the object diagonally in reference to each other.

SUMMARY

The present invention is based on the objective to provide a device for the interferometric measuring of an object and a method for the interferometric measuring of an object so that the determination of additional information is possible in reference to single-beam laser Doppler-vibrometers of prior art. Simultaneously a robust construction and high measuring precision should be provided.

This objective is attained in a device for the interferometric measuring of an object as well as by a method for the interferometric measuring of an object according to the invention. The wording of all claims is explicitly included in the description by way of reference.

The device according to the invention for the interferometric measuring of an object comprises a radiation source for generating an emitted beam, a beam splitter device for dividing the emitted beam into a measuring beam and a reference beam, an optic interference device, and a first detector.

The interference device and the first detector are embodied cooperating such that the measuring beam, at least partially reflected by the object, and the first reference beam are interfered at least on a detector area of the first detector.

With regards to this basic design the device according to the invention is therefore equivalent to interferometers of prior art; in particular typical laser Doppler-vibrometers of prior art show such a design.

It is essential that in the device according to the invention the beam splitter device is embodied to divide the emitted beam into a measuring beam, a first reference beam, and at least one second reference beam. Furthermore, the device according to the invention comprises at least one second detector and the interference device and the second detector are embodied cooperating such that the measuring beam, at least partially scattered by the object, and the second reference beam are interfered on at least one detector area of the second detector.

The device according to the invention therefore comprises at least two detectors, on which beams are respectively interfered for an interferometric assessment. Contrary to devices of prior art the device according to the invention comprises however at least one measuring beam, which is assessed on the one side by the first detector with regards to the at least partially reflected measuring beam and on the other side with regards to the measuring beam at least partially scattered by the object at the second detector.

The device according to the invention therefore exhibits a design different in principle, because the devices of prior art include one separate measuring beam for each detector.

In particular, the invention is based on the following acknowledgement of the applicant:

In the devices of prior art, in which several laser Doppler-vibrometers are combined, so that for example when three vibrometers are used, three measuring beams impact the object, here optimally the focuses of the measuring beams should be precisely overlapping because otherwise a measuring error develops during the rotation of the object about the center of the measuring point.

When interfering measuring beams on the object, i.e. a precise accordance of the measuring points of several vibrometers, here the measuring light of the other two vibrometers is also received by each individual sensor because scattered light is not only collected from the measuring light of the observed channel but also measuring light from other channels, and made to interfere on the detector (optic disturbance). Due to the fact that typically the frequencies of lasers used within a frequency separation coincide, which is defined by the total of a demodulation band width and a heterodyne frequency shift, a considerable disturbing effect develops, which can lead to a total failure of the sensors to measure.

If this problem is circumvented by the measuring points being located slightly locally off-set, the above-stated disturbing effect is reduced, however not eliminated completely.

The above-mentioned method using several vibrometers with one measuring beam each generally show the problem of an optic interference of the detectors due to coupled measuring light of the measuring beams of the other vibrometers.

In prior art it is therefore usually necessary that the measuring points of several vibrometers used must be positioned locally side-by-side on the object in order to at least reduce any optic interference. However, here a limit develops with regards to the diameter of the measuring point, so that typically a diameter of the measuring point of 35 µm cannot be held. However it is desirable to yield multi-dimensional oscillation information for diameters of measuring points of less than 35 µm, particularly less than 15 µm, further preferred less than 5 µm.

In the solution according to prior art measuring occurs coaxially with each vibrometer. In a diagonal impacting of the measuring beam the primary portion of the capacity of the scattered light range is located about the reflected portion of the beam. The detection angle to the axis of the scattered light therefore amounts to twice the incident angle. Due to the fact that for a small focal diameter a high numeric aperture (NA) is required, the desired size of the measuring point of each individual beam shows an opening angle of the measuring beam. This relationship in a homogenous lighting of the aperture of the lens of the microscope (outlet pupil) is given by the connection $$d = 1.22 \frac{\lambda}{NA} \qquad \text{(Formula 0)}$$

with d representing the diameter of the focus in [m], λ the wavelength of the measuring beam in [m], and NA the numeric aperture of the lens.

Due to the fact that the opening angle cannot interfere, here a minimally possible angle results between the beams. Experiments of the applicant have shown that in the solutions of prior art the sensitivity of diagonally impinging vibrometer beams is no longer sufficient for most surfaces when a vertically impacting vibrometer beam is established, because then automatically the incident angle of the diagonally impacting vibrometer becomes excessive. Accordingly, in both vibrometers a smaller diagonal angle must be realized, so that the incident angle keeps from being excessive in a vibrometer.

Thus, when using several vibrometers in general it is not possible to direct one of the measuring beams perpendicularly upon the surface of the sample. This would be desirable, though, with regards to measuring technology because then a channel would directly measure the motion in the z-direction (target direction of the measuring head, which is perpendicular in reference to the intended location of the measuring surface), however due to the above-mentioned problem of diffused light in devices according to prior art it cannot be realized and/or leads to insufficient light with an excessive noise level for signal processing by diagonally measuring detectors.

In typical designs known from prior art a separate lens must be used for each measuring beam, so that there is no space available for another lens for a camera to record a spatially resolved measuring image. Typically here in devices according to prior art a camera may be coupled using a dichroitic beam splitter via a lens of a vibrometer used, in order to allow displaying the measuring point to the user for adjustment purposes. Due to the fact that, for the above-mentioned reasons, the lens shows a diagonal incident angle in reference to the surface of the object in devices of prior art, the image of the camera is also distorted and particularly not focused homogenously (with regards to different local positions). This way it is particularly difficult to perform a scanning measurement using a x-y-table, displacing the object.

The device according to the invention and the method according to the invention described in the following avoid all of the above-mentioned disadvantages. Due to the fact that only one measuring beam, starting at the device, is pointed from the device to the surface of the object to be measured, and on the one side a reflective portion of the measuring beam and on the other side at least one scattered portion of the measuring beam is assessed by one detector each, here oscillation information can be determined over various dimensions without several measuring beams need to the focused on the object, as in devices of prior art.

This way the above mentioned problems are corrected, caused by optical interference and the respective difficulties in signal processing, space problems with regards to objects used for focusing the measuring beam to the object, as well as the limitations regarding potential incident angles of the measuring beam upon the object.

The above-stated objective is also attained in the method according to the invention for an interferometric measuring of the object, which comprises the following processing steps:

In a processing step A an emitted beam is generated by a light source, in a processing step B a splitting of the emitted beam occurs via a beam splitting device into a measuring beam and a first reference beam. In a processing step C an interference of the first reference beam and the measuring beam occurs, at least partially reflected by the object, to at least one detector area of a first detector.

It is essential that in the processing step B the emitted beam is additionally split into at least a second reference beam and the second reference beam is interfered with the measuring beam, at least partially reflected by the object in reference to the measuring beam in order to interfere on the first detector, here with a measuring beam scattered at a different angular range at the object on at least one detector area of a second detector. This light scattered into the different angular range, which is interfered on the other detector area by a second reference beam, is called the reception light in the following, and the allocated optic radiation path the reception beam.

The method according to the invention exhibits the above-mentioned advantages of the device according to the invention.

The device according to the invention is preferably embodied to perform the method according to the invention and/or a preferred embodiment thereof. The method according to the invention is preferably implemented using a device according to the invention and/or a preferred embodiment thereof.

Preferably, via the first detector essentially portions of the measuring beam are measured reflected by the object, i.e. coaxially in reference to the optic axis of the measuring beam, light beams and/or light beam bundles. However, scattered portions of the measuring beam (of the reception beam) are measured by the second detector, i.e. preferably portions not aligned parallel in reference to the optic axis of the measuring beam and/or respective bundles of beams.

The invention is further based on the acknowledgement of the applicant that the scattered light, which is collected at a diagonal angle for example by a lens and is displayed on the second detector, is displaced by a moved surface of the object Doppler frequency. However, the method used in the above-mentioned devices cannot be applied here without changes to evaluate the measuring signal of the detector. However, a formula is known from literature, which has not been applied in the past within the scope of the device according to the invention or the method according to the invention for a direction-dependent Doppler effect in order to correctly describe the phase and/or frequency shift based on the following formula 1:

$$\dot{\phi}_D = \frac{2\pi}{\lambda}(v_x\sin\beta_1 + v_x\sin\beta_2 + v_z\cos\beta_1 + v_z\cos\beta_2) \qquad \text{(Formula 1)}$$

The geometric parameters are discernible from the schematic illustration according to FIG. 1. The remaining parameters are defined as follows: $v_x$ is the speed of the measuring object in the x-direction in [m/s], $v_z$ is the speed of the measuring object in the z-direction in [m/s], and $\dot{\phi}_D$ is the derivative of the phase in [2π rad/s].

If the measuring beam impinges perpendicular in the coordinate system discussed, the formula 1 simplifies to the formula 2:

$$\dot{\phi}_D = \frac{2\pi}{\lambda}(v_x \sin\beta_2 + v_z + v_z \cos\beta_2) \quad \text{(Formula 2)}$$

For the above-mentioned reasons, preferably the measuring beam impacts approximately perpendicular the area of the measuring object to be measured.

As described above, the device according to the invention preferably comprises a first lens, which is arranged in the radiation path of the measuring beam and the first reference beam between the object and a first detector.

This way, particularly the measuring beam can be focused on a measuring point on the object. Preferably the lens comprises a numeric aperture greater than 0.05, preferably greater than 0.1, particularly preferred equivalent or greater than 0.2. This leads to the advantage that according to the formula 0 a small measuring focus develops, which particularly amounts to considerably less than 5 μm in the green wavelength used, even if the aperture of the lens is illuminated with a Gauss-shaped beam. Due to the fact that no additional laser beams impact the measuring surface the focal diameter of the measuring beam is equivalent to the size of the measuring point of the entire system. Due to the circumstance that only one laser beam impacts the objects an extremely small measuring point is achieved and any optic interference cannot occur. This essential knowledge has led to the concept of the present invention.

Furthermore it is advantageous that the first lens is also arranged in the radiation path of the reception beam between the lens and the second detector. This way, only one lens is necessary in order to display the reflected measuring beam on the first detector, on the one side, and the scattered measuring beam (reception beam) on the second detector, on the other side.

In another preferred embodiment the device comprises a second lens, which is arranged in the radiation path of the reception beam between the lens and the second detector. This way, by the second lens the optic illustration of the scattered measuring beam on the second detector can be selected in a targeted fashion. In particular it is advantageous that the numeric aperture of the second lens is lower than 0.15, preferably lower than 0.1, further preferred lower than 0.06. The numeric aperture can be selected smaller because the size of the measuring point is not influenced by the numeric aperture of the reception beam. This way the advantages develop that a smaller detection angle can be selected which must be equivalent to at least the sum of half the opening angle of the measuring beam and half the opening angle of the reception beam. Furthermore, this leads to a greater area overlapped in the z-direction, which is equivalent to a greater range of depth measurement.

In another preferred embodiment the device according to the invention for a heterodyne measurement via the first detector is embodied such that a device is provided for a frequency shift between the measuring beam and a first reference beam, which can preferably be achieved by an optic frequency shifter, such as a Bragg-cell, e.g. This way, here in a manner known per se the direction of motion of the surface of the object measured can be determined as well. In particular it is advantageous that in all reference beams one frequency displacement device each is arranged between the measuring beam and the reference beam so that the heterodyne design is therefore given with regards to all reference beams. A particularly simple design results from the preferred embodiment in which only the measuring beam is frequency modulated, so that the measuring beam is displaced in reference to all reference beams with regards to frequency and thus here a completely heterodyne design is given with regards to all detectors.

In another preferred embodiment the device is embodied as a confocal microscope with regards to the beam path of the measuring beam and a first reference beam. This way, the advantage results that non-focal radiation is not displayed on the detector. A typical confocal design can be realized by providing an optic pinhole in the radiation path of the measuring beam and the first reference beam. Preferably the confocal design is yielded by embodying the detector as an optic pinhole.

In another preferred embodiment the beam splitting device is embodied to split the emitted beam into a measuring beam, a first reference beam, a second reference beam, and at least one third reference beam. Furthermore, the device comprises at least one third detector, and the interference device and the third detector are embodied cooperating such that the beam at least partially scattered by the object and the third reference beam are interfered at least on a detector area of the third detector. This way a measuring of an oscillation or deflection of the surface of the object is possible in three dimensions.

In particular it is advantageous that the device is embodied such that a first plane, which is defined by the measuring beam and the reception beam, forms an angle greater than 45°, preferably greater than 85° with a second plane, which is formed by the measuring beam and the third reference beam. This way it is ensured that a sufficiently precise separation of the information about motions is possible in three dimensions.

Preferably, the angle between the measuring beam and at least one reception beam is less than 40°, preferably less than 30°. In particular it is advantageous that in all reception beams the angle between the measuring beam and the reception beam is respectively below 40°, preferably below 30°. This way a high signal-noise ratio is ensured for the reception beams and a large range of depth measurement.

Preferably the radiation source is embodied as a longitudinal single-mode laser. This way the advantage results that no disturbing interferences between the modes develop by the optic mixing effects. In particular it is advantageous to embody the radiation source additionally as a transversal single-mode laser, so that furthermore the advantage develops that the measuring laser beam can be optimally focused and a minimal measuring point-diameter is yielded. A laser with a $M^2$-factor of less than 1.5 has proven sufficient for good focusing effects.

Experiments of the applicant have shown that particularly the embodiment of the radiation source as a laser with a wavelength in the visible range is advantageous, preferably as a DPSS-laser with a wavelength of 532 nm.

In order to yield a small measuring point it is advantageous for all detectors to only evaluate light of the reflected or scattered measuring beam of one measuring area on the object with a diameter of less than 35 μm, particularly less than 15 μm, further preferred less than 5 μm. In particular the optic components and here for example one or more lenses of the device are preferably embodied such that a measuring range is displayed on the object with a diameter less than 35 µm, particularly less than 15 µm, further preferred less than 5 µm on the measuring area of the detectors.

The method according to the invention is preferably embodied such that the measuring signals of the first and the second detector are each phase modulated so that a multi-dimensional evaluation of the deflection of the surface of the object can be performed.

In another advantageous embodiment of the method according to the invention the measuring signals of the first detector are phase modulated, in order to perform a deflection of the surface of the object and the measuring signals of the second detector are amplitude modulated in order to perform an assessment of the intensity of the scattered measuring beam. This way, in a simple fashion both the deflection in the direction of the optic axis of the measuring beam as well as the intensity of the scattered light can be measured with a precision not achieved in prior art. This results in a plurality of new applications:

In particular it is possible to detect unevenness or flawed particles on an essentially smooth surface by determining from a relative motion of the measuring beam in reference to the surface any changes of the surface (in the transferred sense the "deflection") by way of phase modulation of the measuring signals of the first detector and furthermore the light scattered by the flawed particles via amplitude modulation of the measuring signals of the second detector.

Preferably the method according to the invention is therefore embodied such that a surface topography of the object is determined, comprising the following steps:
   Moving the object in reference to the measuring beam, preferably essentially perpendicular in reference to the optic axis of the measuring beam, and
   Measuring the deflection via the first detector as well as measuring the scattered light via the second detector.

BRIEF DESCRIPTION OF THE DRAWINGS

In the following additional features and preferred embodiments are described based on the figures and the exemplary embodiments. Shown are.

DETAILED DESCRIPTION OF THE PREFERRED EMBODIMENTS

Figure 1:
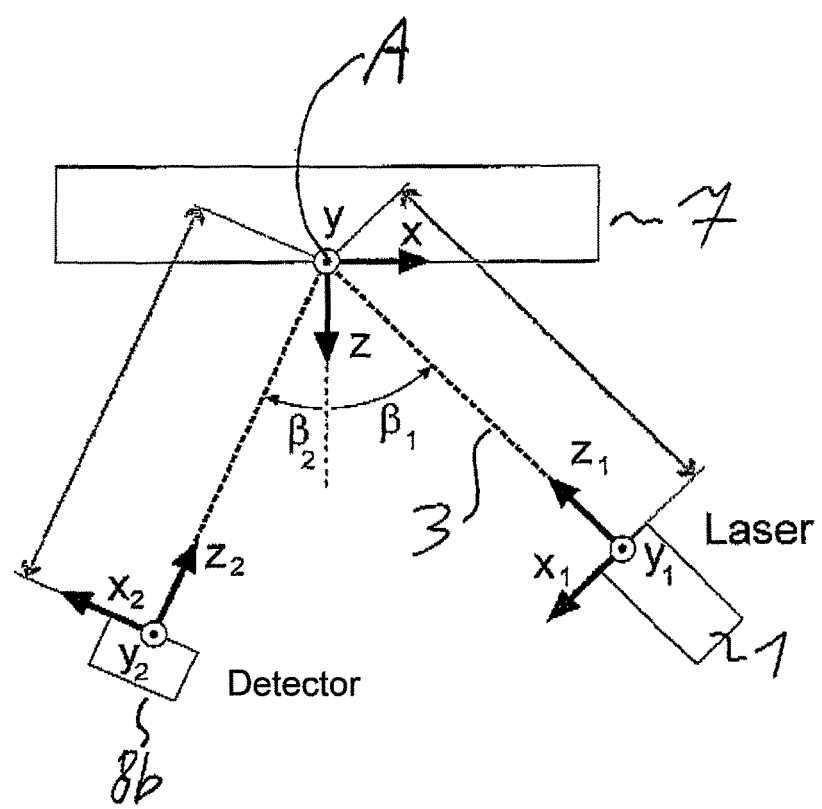
FIG. 1 is a schematic illustration of a typical design of a device according to the invention for illustrating the geometric parameters of the formula 1, which describes the Doppler effect depending on the direction.

FIG. 1 shows the geometric arrangement for applying the above-mentioned formula 1 based on a first exemplary embodiment.

Figure 2:
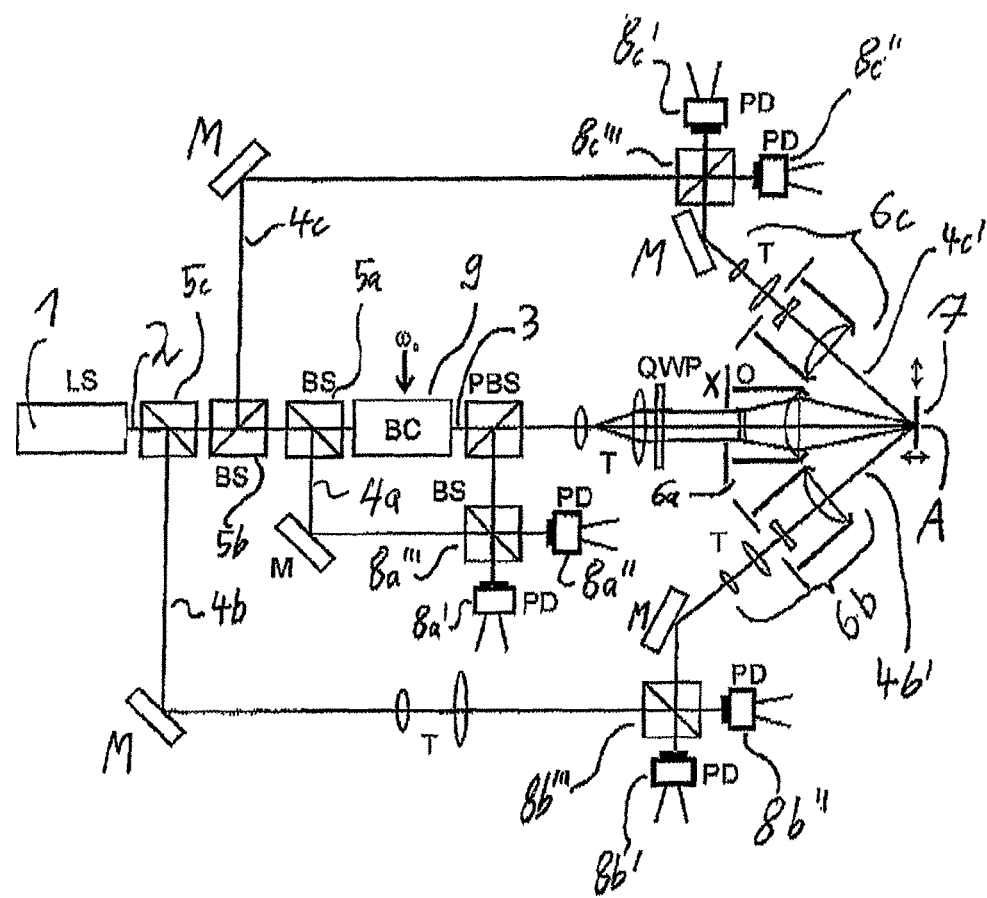
FIG. 2 is a schematic illustration of a first exemplary embodiment of a device according to the invention.

For an easier understanding here initially the first exemplary embodiment is explained based on the schematic illustration according to FIG. 2.

In the first exemplary embodiment a light source 1 is embodied as a laser with a wavelength of 532 nm. An emitted beam 2, which is generated by the laser, is split by the beam splitting device into a measuring beam 3 and a first reference beam $4a$, a second reference beam $4b$, and a third reference beam $4c$.

For this purpose, the beam splitting device comprises several beam splitters $5a$, $5b$, and $5c$. The measuring beam 3 is displayed via a first lens $6a$ on a measuring point A on an object 7 to be measured. The measuring beam reflected by the surface of the object 7 at the measuring point A in turn enters the beam path of the first lens $6a$ and is displayed via an optic interference device on a first detector $8a$, which first detector $8a$ comprises two photo-detectors $8a'$ and $8a''$. The optic interference device comprises the mirror M, the polarization beam splitter PBS. The detector comprises an additional beam splitter $8a'''$ for interfering the radiation on the two photo-detectors $8a'$ and $8a''$.

The design of the first photo-detector is therefore equivalent to the design of the so-called "balanced detector" arrangement known per se.

A confocal design is realized via a pinhole X in the radiation path of the measuring beam and a first reference beam.

Furthermore, a frequency displacement device 9 is arranged in the radiation path of the measuring beam 3, embodied as a Bragg-cell, in order to embody a heterodyne design with regards to the measuring beam and all reference beams. Alternatively the frequency displacement device 9 may be arranged in the radiation path of one or both reference beams.

The first measuring beam is displayed in a manner known per se via a telescope T and Lambda quarter-wavelength plates QWP on the measuring point A on the object 7 and accordingly the recoupled, reflected measuring beam is displayed via this optic design on the first detector $8a$.

The device according to FIG. 2 also comprises a second detector $8b$ similar to the first detector $8a$, which comprises two photo-detectors $8b'$ and $8b''$ as well as a beam splitter $8b'''$ for a balanced-detector arrangement. The portion of the measuring light scattered at the measuring point A on the object 7 is collected as the first reception beam $4b'$, partially via a second lens $6b$, and interfered with the second reference beam $4c$ via the mirror M and another telescope T on the second detector $8b$.

Similarly, a third lens $6c$ is provided, which collects portions of the measuring beam scattered in another spatial angle at the point A of the object 7 as a second reception beam $4c'$ and displays it via the mirror M on a third detector $8c$, which third detector $8c$ comprising in an analog design two photo-detectors $8c'$ and $8c''$ as well as a beam splitter $8c'''$. Similarly, the scattered light portions of the measuring beam, collected by the lens $6c$, are interfered with a third reference beam $4c$ on the measuring area of the photo detectors $8c'$ and $8c''$.

The device is preferably arranged and embodied such that the measuring beam 3 impacts the measuring point A approximately perpendicular in reference to the area normal of the object 7.

The measuring point generated by the first lens $6a$ shows a diameter of less than 5 µm.

For this purpose, the first lens shows a numeric aperture of approximately 0.2. The numeric apertures of the second and third lens $6b$ and $6c$ amount to approximately 01, however.

The three detectors $8a$, $8b$, and $8c$ are connected to an assessment unit (not shown) which is embodied in a manner known per se, in order to perform amplitude modulations and/or phase demodulations of the measuring signals of the photo-detectors.

This way, it is possible to measure for example a motion of the measuring point A on the surface of the object 7 in three dimensions. Here, it is possible for the first time to perform this with a measuring point showing a diameter of 5 μm, without here the disturbing effects occur that are reported in prior art.

In order to assess the three-dimensional oscillation information the Doppler effect, depending on the direction, is considered, preferably according to formula 1.

The importance of the geometric parameters of formula 1 is illustrated in the schematic representation according to FIG. 1:

The light source embodied as a laser, with its emitted beam being split into a measuring beam 3 and several reference beams, is arranged such that the measuring beam 3 impacts the measuring point A on the area normal of the object 7 at an angle β1. The areal normal furthermore defines the xy-plane and the z-axis arranged perpendicular in reference thereto.

The second detector 8b is arranged at an angle β2.

As already stated, FIG. 2 shows a schematic illustration of an exemplary embodiment of a device according to the invention, in which for a simplified illustration all radiation paths are shown two-dimensionally.

Figure 3:
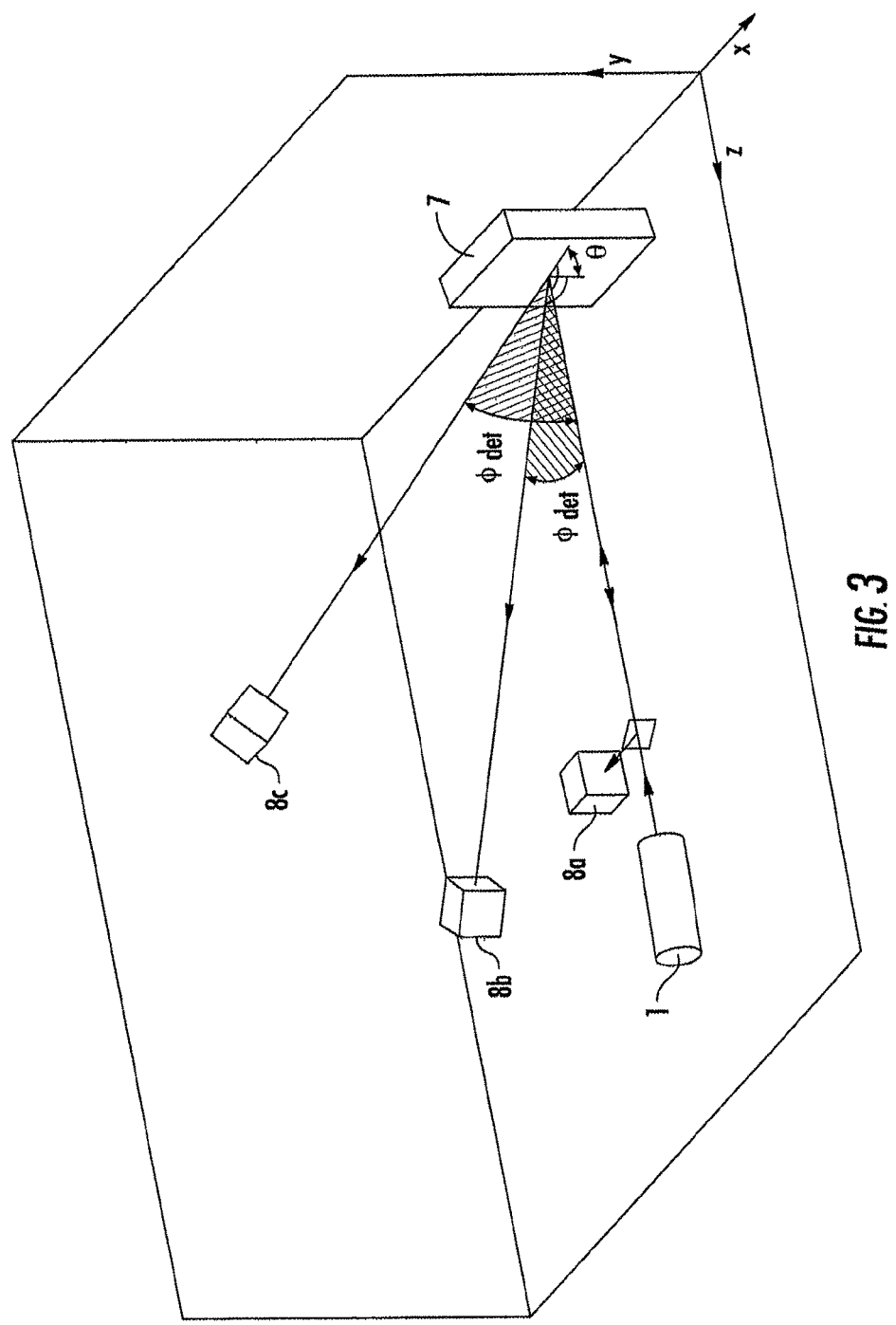
FIG. 3 is a spatial arrangement of a light source and detectors of the first exemplary embodiment shown in FIG. 2.

FIG. 3 shows the actual spatial arrangements of the light source 1, the first detector 8a, the second detector 8b, and the third detector 8c in a spatial illustration particularly with regards to the x, y, and z-coordinates defined by the area normal of the measuring object 7 at the measuring point A. In particular, the angles φdet are marked, which are preferably less than 40°. Additionally, a first plane, which is defined by the measuring beam and the first reception beam 4b' for the second detector 8b, forms an angle θ greater than 45°, preferably greater than 85° with a second plane, which is formed by the measuring beam and the second reception beam 4c' for the third detector 8c. This way it is ensured that a sufficiently precise separation of the information about motions is possible in three dimensions.

Figure 4A:
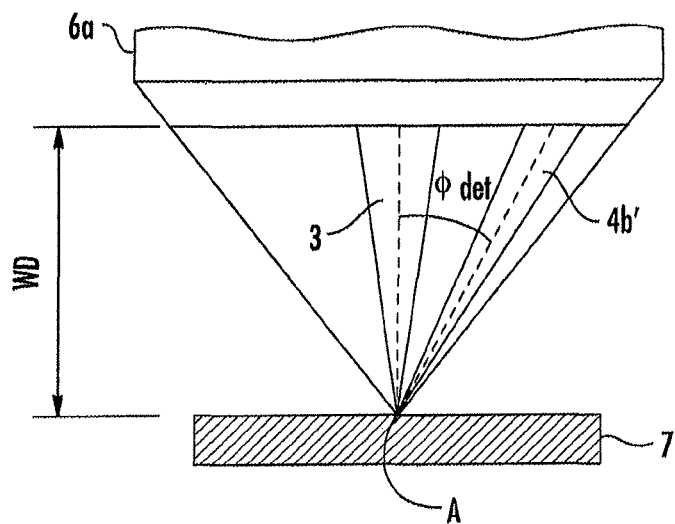
FIG. 4 are schematic illustrations of the radiation paths in exemplary embodiments of the device according to the invention with one lens (detail A) and several lenses (detail B).
Figure 4B:
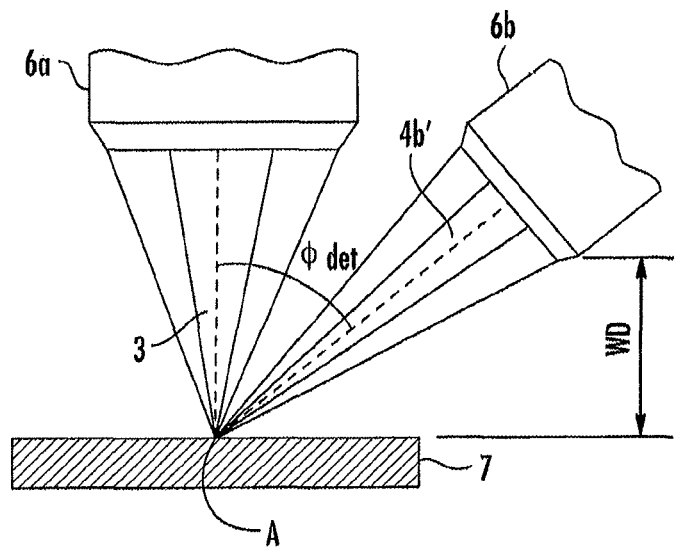

FIG. 4 shows two details of exemplary embodiments of the device according to the invention:

The detail A shows an exemplary embodiment in which via only one lens 6a both the measuring beam 3 is displayed on the measuring point A on the measuring object 7 as well as a first reference beam 4a, aligned at a spatial angle φdet in reference thereto, is displayed by the very same lens on the second detector via additional components.

The detail B however shows an exemplary embodiment in which via a first lens 6a the measuring beam 3 is displayed on the measuring point A of the object 7 and a scattered light portion of the measuring beam 3, via a second lens 6b and additional optic components, is displayed on the second detector 8b.

The invention claimed is:

1. A device for interferometric measuring of an object, comprising:
   a light source to generate an emitted beam,
   at least one beam splitter that splits the emitted beam into one measuring beam and at least first, second, and third reference beams,
   at least a first detector, a second detector, and a third detector, the first detector being arranged such that said one measuring beam at least partially reflected by the object at a measuring point and the first reference beam are interfered on at least one detection area of the first detector such that the first detector measures portions of said measuring beam reflected by the object at said measuring point and coaxially in reference to an optic axis of said one measuring beam,
   the second detector being arranged such that said one measuring beam as a first reception beam, at least partially scattered by the object at said measuring point and at a different angular range than the at least partially reflected measuring beam, and the second reference beam are interfered on at least one detector area of the second detector such that the second detector measures portions of said one measuring beam scattered by the object at said measuring point and not aligned parallel in reference to the optic axis of said one measuring beam, and
   the third detector being arranged such that the measuring beam as a second reception beam, at least partially scattered by the object at said measuring point and at a different angular range than the at least partially reflected measuring beam and the first reception beam, and the third reference beam are interfered on at least one detector area of the third detector, such that that the third detector measures portions of said one measuring beam scattered by the object at said measuring point and not aligned parallel in reference to the optic axis of said one measuring beam or the first reception beam, and a measurement of an oscillation or deflection of the surface of the object is determinable in three dimensions,
   wherein a plane which includes the at least partially reflected measuring beam and the first reception beam is different than a plane which includes the at least partially reflected measuring beam and the second reception beam.

2. A device according to claim 1, further comprising a first lens, which is arranged in a radiation path of the measuring beam, and the at least partially reflected measuring beam between the object and the first detector, and a numeric aperture of the lens is greater than 0.1.

3. A device according to claim 2, wherein the first lens is further arranged in a radiation path of the first reception beam between the object and the second detector.

4. A device according to claim 2, further comprising a second lens which is arranged in a radiation path of the first reception beam between the object and the second detector, and a numeric aperture of the second lens is less than 0.15.

5. A device according to claim 1, wherein the device is embodied for a heterodyne measuring via the first detector by an optic frequency shifter that displaces the frequency between the measuring beam and all of the reference beams.

6. A device according to claim 1, wherein the device is embodied as a confocal microscope with regards to radiation paths of the measuring beam and the first reference beam.

7. A device according to claim 1, wherein
   a first plane, which is defined by the measuring beam and the first reception beam, forms an angle greater than 45° with a second plane, which is formed by the measuring beam and the second reception beam.

8. A device according to claim 1, wherein an angle between the measuring beam and at least one receiving beam is less than 30°.

9. A device according to claim 1, wherein the light source is embodied as a longitudinal single-mode laser.

10. A device according to claim 9, wherein the single-mode laser is additionally embodied as a transversally single-mode laser with a $M^2$-factor smaller than 1.5.

11. A device according to claim 1, wherein the light source is embodied as a laser with a wavelength in the visible range.

12. A device according to claim 11, wherein the light source is embodied as a DPSS-laser with a wavelength of 532 nm.

13. A device according to claim 1, further comprising at least one mirror in a path of at least one of the first or second reception beams to the second and third detectors, respectively, or in a path of the at least one of the second or third reference beams to the second and third detectors, respectively.

14. A device according to claim 1, further comprising at least one mirror in a path of each of the first and second reception beams to the second and third detectors, respectively, and in a path of the at least one of the second and third reference beams to the second and third detectors, respectively.

15. A device according to claim 1, further comprising at least one mirror in a path of the first reference beam to the first detector, and a polarization beam splitter in a path of said measuring beam reflected by the object to the first detector.

16. A device according to claim 1, further comprising a first lens located along a path of the measuring beam reflected by the object adapted to focus the measuring beam reflected by the object toward the first detector, and at least of a separate, second lens for at least one of the first or second reception beams adapted to focus the at least one of the first and second reception beams on the second or third detector, respectively.

17. A method for the interferometric measuring of an object, comprising the following processing steps:
  A) generating an emitted beam via a light source;
  B) splitting the emitted beam via at least one beam splitter into one measuring beam and at least first, second, and third reference beams;
  C) interfering a first reference beam and said one measuring beam, at least partially reflected by the object at a measuring point, to at least one detector surface of a first detector such that the first detector measures portions of said one measuring beam reflected by the object at said measuring point and coaxially in reference to an optic axis of said one measuring beam;
  D) interfering the second reference beam and a first reception beam formed by said one measuring beam, scattered at least partially by the object at said measuring point and at a different angular range than the at least partially reflected measuring beam, on at least one detector area of the second detector such that the second detector measures portions of said one measuring beam scattered by the object at said measuring point and not aligned parallel in reference to the optic axis of said one measuring beam; and
  E) interfering the third reference beam and a second reception beam formed by said one measuring beam, scattered at least partially by the object at said measuring point and at a different angular range than the at least partially reflected measuring beam and the first reception beam, on at least one detector area of a third detector such that the third detector measures portions of said one measuring beam scattered by the object at the measuring point and not aligned parallel in reference to the optic axis of said one measuring beam or the first reception beam, such that a measurement of an oscillation or deflection of the surface of the object is determinable in three dimensions,
  wherein a plane which includes the at least partially reflected measuring beam and the first reception beam is different than a plane which includes the at least partially reflected measuring beam and the second reception beam.

18. A method according to claim 17, further comprising phase modulating measuring signals of the first and the second detector for a multi-dimensional assessment of a deflection of the surface of the object.

19. A method according to claim 17, further comprising phase modulating the measuring signals of the first detector for an assessment of a deflection of the surface of the object and amplitude modulating the measuring signals of the second detector for an evaluation of an intensity of the scattered measuring beam.

20. A method according to claim 19, wherein a surface topography of the object is determined, comprising the following processing steps:
  moving the object in reference to the measuring beam, perpendicular in reference to an optic axis of the measuring beam, and
  measuring a deflection via the first detector as well as measuring the scattered light via the second detector.

* * * * *